(12) United States Patent
Dickow et al.

(10) Patent No.: US 9,924,017 B2
(45) Date of Patent: Mar. 20, 2018

(54) METHODS AND SYSTEMS FOR A VEHICLE COMPUTING SYSTEM TO LAUNCH AN APPLICATION

(71) Applicant: Myine Electronics, Inc., Ferndale, MI (US)

(72) Inventors: Justin Dickow, Royal Oak, MI (US); Joel J. Fischer, Royal Oak, MI (US)

(73) Assignee: Livio, Inc., Royal Oak, MI (US)

( * ) Notice: Subject to any disclaimer, the term of this patent is extended or adjusted under 35 U.S.C. 154(b) by 0 days.

(21) Appl. No.: 14/723,945

(22) Filed: May 28, 2015

(65) Prior Publication Data

US 2016/0352886 A1 Dec. 1, 2016

(51) Int. Cl.
*H04M 1/725* (2006.01)
*H04M 1/60* (2006.01)

(52) U.S. Cl.
CPC ...... *H04M 1/72527* (2013.01); *H04M 1/6075* (2013.01)

(58) Field of Classification Search
CPC . H04W 8/245; H04W 8/265; H04M 1/72525; H04M 2207/18; H04M 3/42178; H04M 1/6075
See application file for complete search history.

(56) References Cited

U.S. PATENT DOCUMENTS

| | | | | |
|---|---|---|---|---|
| 2011/0252430 | A1* | 10/2011 | Chapman | G06F 9/485 718/107 |
| 2011/0292454 | A1 | 12/2011 | Karmakar et al. | |
| 2013/0024812 | A1 | 1/2013 | Reeves et al. | |
| 2013/0061249 | A1 | 3/2013 | Schwartz et al. | |
| 2014/0053097 | A1* | 2/2014 | Shin | G06F 9/4443 715/779 |
| 2014/0280580 | A1* | 9/2014 | Langlois | H04W 4/005 709/204 |
| 2016/0150072 | A1* | 5/2016 | Rangarajan | H04W 4/003 455/574 |

* cited by examiner

*Primary Examiner* — Ted Wang
(74) *Attorney, Agent, or Firm* — Jennifer M. Stec; Brooks Kushman P.C.

(57) ABSTRACT

A vehicle computing system includes at least one processor in communication with a mobile device via a wireless transceiver. The at least one processor is configured to launch a second application from an inactive state at the mobile device based on a message transmitted to a first application in an active state being executed in a foreground at the mobile device. The message is configured with an application identification of the second application.

8 Claims, 5 Drawing Sheets

METHODS AND SYSTEMS FOR A VEHICLE COMPUTING SYSTEM TO LAUNCH AN APPLICATION

TECHNICAL FIELD

The present disclosure relates to a vehicle computing system tracking and launching applications at a connected mobile device.

BACKGROUND

Vehicle based computing systems are growing in popularity. Using various sources of vehicle information, driver inputs and connections to vehicle systems, the computing system may add a variety of functionality and novelty to the driving experience. Furthermore, systems may often communicate with remote devices either to gain information from those devices, or to use those devices to access an application. For example, in one instance, the vehicle computing system may communicate with a mobile device, and use the mobile device's ability to execute an application at the mobile device to send and receive information from the application.

SUMMARY

In at least one embodiment, a vehicle computing system includes at least one processor in communication with a mobile device via a wireless transceiver. The at least one processor is configured to, in response to receiving a user request associated with a second mobile device application in a non-foreground state, send a launch message identifying the second mobile device application to a first mobile device application in a foreground state to launch the second mobile device application.

In at least one embodiment, a mobile device includes at least one processor configured in communication with a vehicle processor via a wireless transceiver. The at least one processor is configured to communicate data from a first application executing in an active state to the vehicle processor using an application program interface. The at least one processor is configured to receive a launch request, via the first application, for a second application in an inactive state from the vehicle processor based on a user request. The at least one processor is configured to launch the second application to the active state.

In at least one embodiment, a computer program product embodied in a non-transitory computer readable medium that is programmed for a vehicle processor comprises instructions for establishing the vehicle processor to communicate with a mobile device having first and second applications. The non-transitory computer readable medium comprises further instructions for sending a launch message to the first mobile device application in a foreground state to launch the second mobile device application in a non-foreground state in response to receiving a request associated with the second mobile device application.

DETAILED DESCRIPTION

Figure 1:
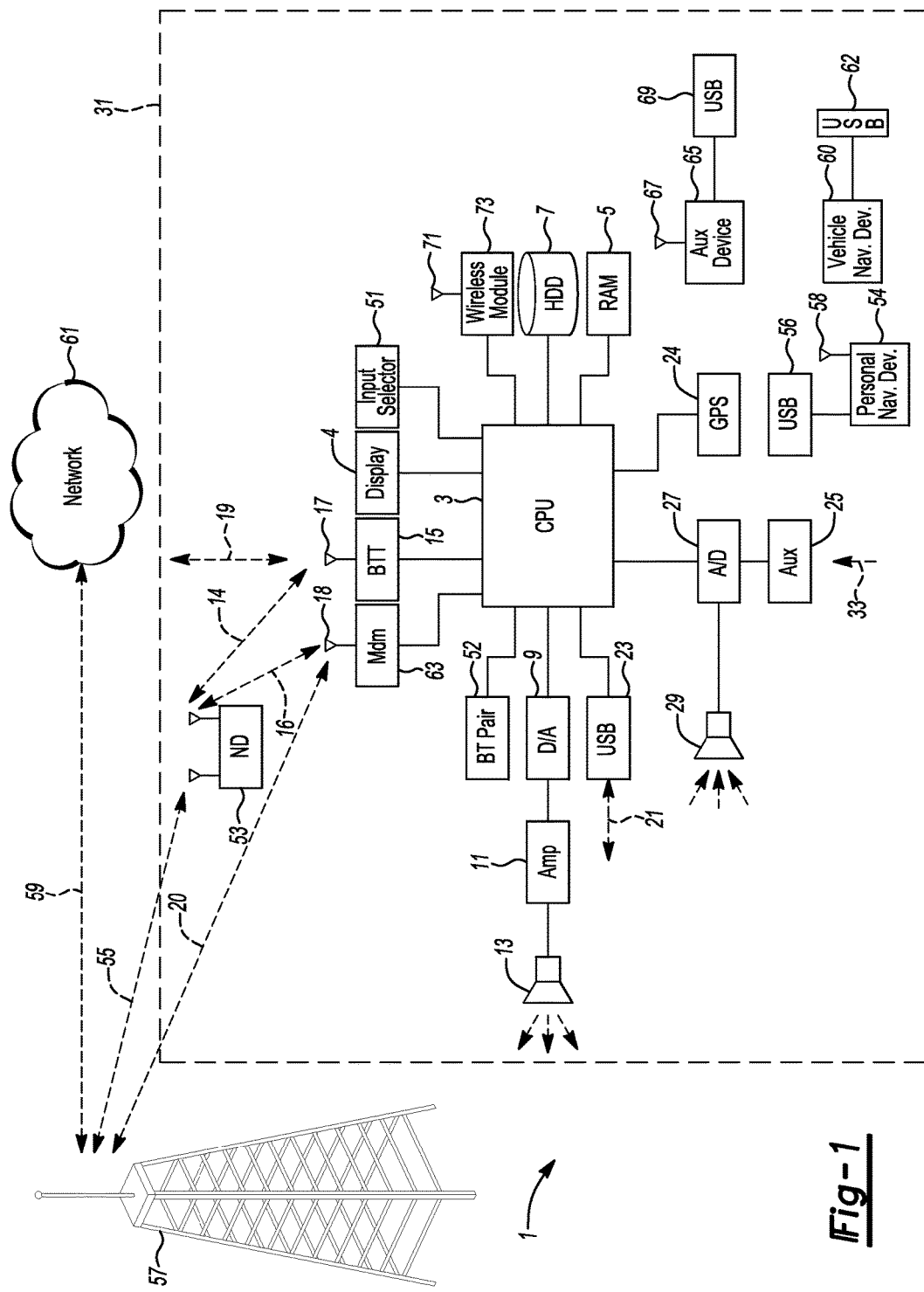
FIG. 1 is a representative block topology of a vehicle infotainment system implementing a user interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (FLASH, random access memory (RAM), read only memory (ROM), electrically programmable read only memory (EPROM), electrically erasable programmable read only memory (EEPROM), or other suitable variants thereof, for example) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to a vehicle based computing system (VCS) configured to track which applications are running in a foreground and non-foreground states (background state and closed state, for example) of a mobile device (smart phone, for example). A notification is sent to the VCS indicating which applications are in the foreground, background and closed state. An application in the foreground and background state at the mobile device may be recognized as an active state application. The active state application may communicate with the VCS. An application in the closed state at the mobile device may be recognized as an inactive state. The VCS (head unit, for example) may transmit a message to the mobile device to launch an application that is in the closed state of the mobile device using the application in the foreground state.

For example, in response to tracking applications at the mobile device, the VCS may transmit a request to launch an application running in the closed state of the mobile device based on the system communicating with an application in the foreground state. The VCS may transmit a message configured with an application identifier for the application in the closed state via the foreground application. The foreground application may receive the application identifier and transmit a launch request to the application in the closed state. In response to launching an inactive application using the foreground application, the VCS may track the state of one or more applications at the mobile device to manage launching of non-foreground state applications.

The embodiments of the present disclosure generally provide for the VCS to be programmed to track and launch applications at the mobile device. In general, the VCS may be designed to allow for transmission of launch messages using a wireless communication including, but not limited to, Bluetooth technology. The present disclosure generally provides systems and methods to allow the ability to transmit an application launch message to the mobile device, therefore managing applications executed at the mobile device from a user interface of the VCS.

FIG. 1 illustrates an example block topology for a vehicle based computing system 1 (VCS) for a vehicle 31. An example of such a VCS 1 is the SYNC system manufactured by THE FORD MOTOR COMPANY. A vehicle enabled with a VCS 1 may contain a visual front end interface 4 located in the vehicle 31. The user may also be able to interact with the interface if it is provided, for example, with a touch sensitive screen. In another illustrative embodiment, the interaction occurs through button presses and/or spoken dialog with automatic speech recognition and speech synthesis.

In the illustrative embodiment 1 shown in FIG. 1, a processor 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to choose between various inputs. Input to both the microphone and the auxiliary connector is converted from analog to digital by a converter 27 before being passed to the processor. Although not shown, numerous vehicle components and auxiliary components in communication with the VCS 1 may use a vehicle network (such as, but not limited to, a CAN bus) to pass data to and from the VCS (or components thereof).

For example, a near field communication (NFC) transceiver (not shown) may be integrated with the VCS 1. The NFC transceiver may communicate with the processor 3. The NFC transceiver 75, such as a Texas Instrument™ TRF7970A, may be configured to communicate with one or more mobile devices. The NFC transceiver may include an RFID tag, a loop antenna, a flexible fabric packaging material and an EMI shielding material. The NFC transceiver may be used to communicate and authentic a mobile device. For example, the NFC transceiver may communicate with the mobile device configured with NFC and having an application embedded within the mobile device computing system.

Outputs to the system can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21, respectively.

In one illustrative embodiment, the system 1 uses the BLUETOOTH transceiver 15 to communicate 17 with a user's mobile device 53 (cell phone, smart phone, tablet, PDA, or any other device having wireless remote network connectivity, for example). The mobile device (nomadic device, for example) can then be used to communicate 59 with a network 61 outside the vehicle 31 through, for example, communication 55 with a cellular tower 57. In some embodiments, tower 57 may be a WiFi access point. Communication between the mobile device 53 and the BLUETOOTH transceiver is generally represented by signal 14.

Pairing a mobile device 53 and the BLUETOOTH transceiver 15 can be instructed through a button 52 or similar input. Accordingly, the CPU is instructed that the onboard BLUETOOTH transceiver will be paired with a BLUETOOTH transceiver in a mobile device 53.

In another example, the mobile device 53 and the NFC transceiver may be configured to communicate with each other via one or more applications executed on hardware at the VCS 1. The processor 3 may instruct the NFC transceiver to communicate with the mobile device 53. For example, the processor may transmit one or more messages to the mobile device 53 via the NFC transceiver. In another example, the processor 3 may receive one or more messages from the mobile device 53 via the NFC transceiver.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an application program interface (API) to communicate with modem application software. An example of such an API is the SmartDevice- Link project providing a software framework to integrate brought in applications onto the VCS. The modem application software may access an embedded module or firmware on the BLUETOOTH transceiver to complete wireless communication with a remote BLUETOOTH transceiver (such as that found in a mobile device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, mobile device 53 includes a modem for voice band or broadband data communication. In the data-over-voice embodiment, a technique known as frequency division multiplexing may be implemented when the owner of the mobile device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data plan allows for broad-band transmission and the system could use a much wider bandwidth (speeding up data transfer). In still another embodiment, mobile device 53 is replaced with a cellular communication device (not shown) that is installed to vehicle 31. In yet another embodiment, the mobile device (the nomadic device illustrated as ND 53, for example) may be a wireless local area network (LAN) device capable of communication over, for example (and without limitation), an 802.11g network (i.e., WiFi) or a WiMax network.

In one embodiment, incoming data can be passed through the mobile device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary devices 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having various processes executed by a vehicle computing system located in a vehicle, in certain embodiments, processes may be executed by a computing system in communication with a vehicle computing system. Such a system may include, but is not limited to, a wireless mobile device (mobile phone, for example) or a remote computing system (a server, for example) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process includes sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the representative processes.

Figure 2:
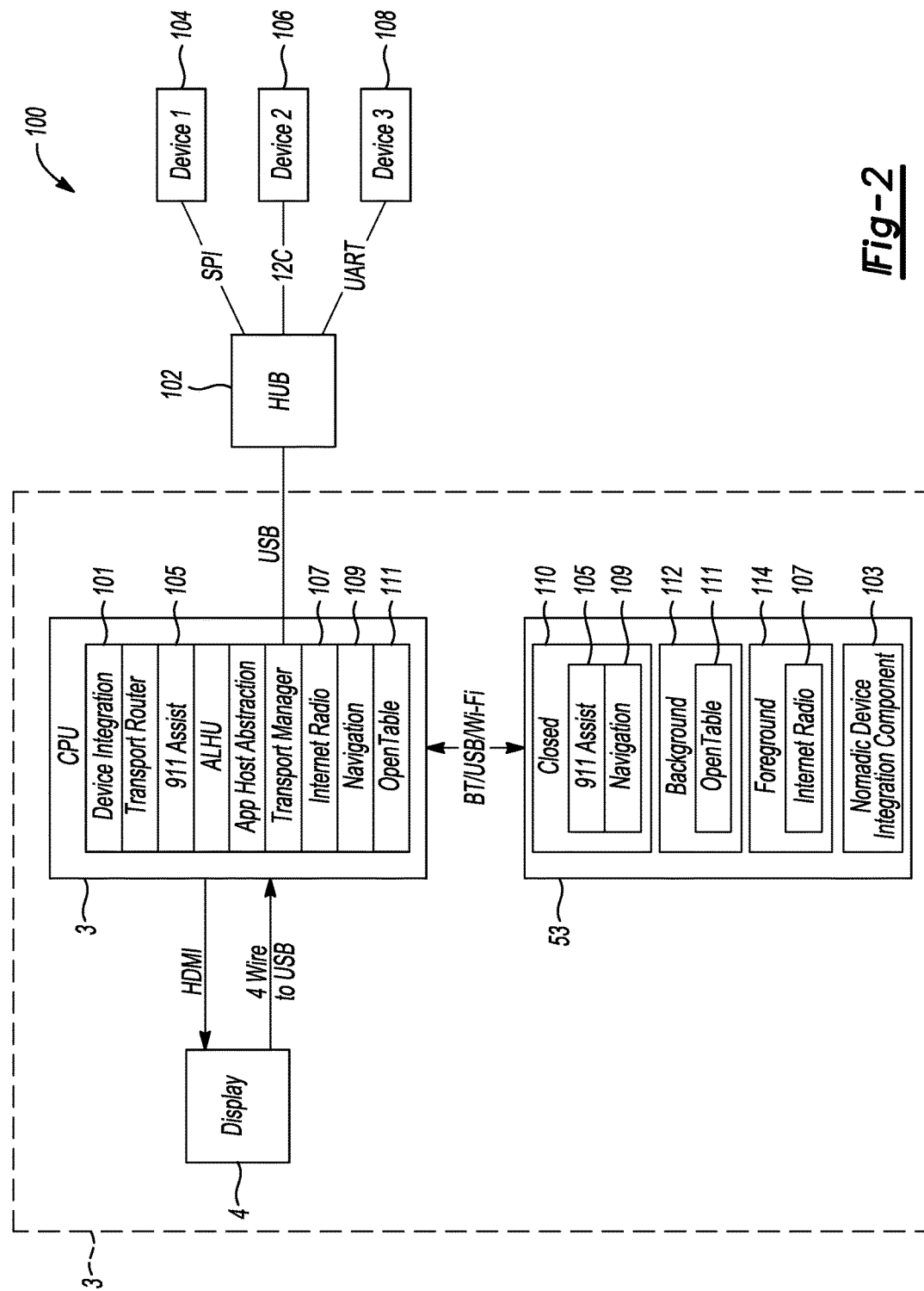
FIG. 2 is a representative block topology of a system for integrating one or more connected devices with the vehicle based computing system according to an embodiment.

FIG. 2 is a representative block topology of a system 100 for integrating one or more connected devices with the VCS 1. The CPU 3 may be in communication with one or more transceivers. The one or more transceivers are capable of wired and wireless communication for the integration of one or more devices. To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, and point of interest location and management services for various possible vehicle 31 destinations. For example, the CPU 3 may output one or more applications at the display 4 that are executed at the connected mobile device 53.

As mentioned above, the CPU 3 of the VCS 1 may be configured to interface with one or more mobile devices 53 of various types. The mobile device 53 may further include a device integration client component 103 to allow the mobile device 53 to take advantage of the services provided by the device integration framework 101. The integration client component 103 may include an application program interface to enable the interaction between the mobile device 53 and the VCS 1. The mobile device 53 may execute one or more applications including, but not limited to, 911 Assist™ 105, internet radio 107, navigation 109, OpenTable™ 111, etc. The one or more applications may be in a closed state 110, a background state 112 or a foreground state 114 state at the mobile device 53. The CPU 3 may output the one or more applications at the display 4. For example, in response to an establish communication with the mobile device 53, the CPU 3 may receive a message indicating whether the one or more applications are in the foreground state 114, background state 112 or closed state 110. In one example, the VCS may display the one or more applications in a foreground state 114, background state 112, or closed state 110 based on the color, brightness and/or shading of an icon representing the application(s).

The mobile device 53 may transmit application notifications to the CPU 3 so that the VCS 1 may track which application is in the foreground state. For example, the VCS 1 may receive a message that the internet radio application 107 is running in the foreground state 114. The VCS 1 may output for display an icon for the internet radio application 107 indicating that the application is active in the foreground state 114.

In one example, the VCS 1 may receive an application launch request for 911 Assist™ 105. The VCS 1 may receive the 911 Assist™ application 105 launch request from manually input via the display 4 and/or automatically based on a received emergency notification via an advanced crash safety module (ACSM). In response to the 911 Assist™ 105 in the closed state 110 at the mobile device 53, the CPU 3 may transmit a launch request for the 911 Assist™ application 105 via communication with the internet radio application 107 in the foreground state 114. The internet radio application 107 may launch the 911 Assist™ application 105 in the closed state 110 at the mobile device 53 based on the launch request from the CPU 3. For example, the launch request may include a uniform resource identifier (URL) for the 911 Assist™ application 105. In response to receiving the launch message for the 911 Assist™ application 105 at the mobile device 53, the internet radio application 107 may be used to launch the closed state application 110. In response to launching the 911 Assist™ application 105 to be in active communication with the VCS by moving to the foreground state 114, the internet radio application 107 may go to the background state 112 while remaining in active communication with the VCS 1.

The one or more transceivers may include a multiport connector hub 102. The multiport connector hub 102 may be used to interface between the CPU 3 and additional types of connected devices other than the mobile device 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108. The CPU 3 may receive a message from the connected devices indicating applications running in the foreground state. In another example, the CPU may receive one or more message indicating the change in states of the applications stored at the connected device. The CPU 3 may transmit a request to the connected devices to launch applications in a non-foreground state via an application in the foreground state at the connected device.

Figure 3:
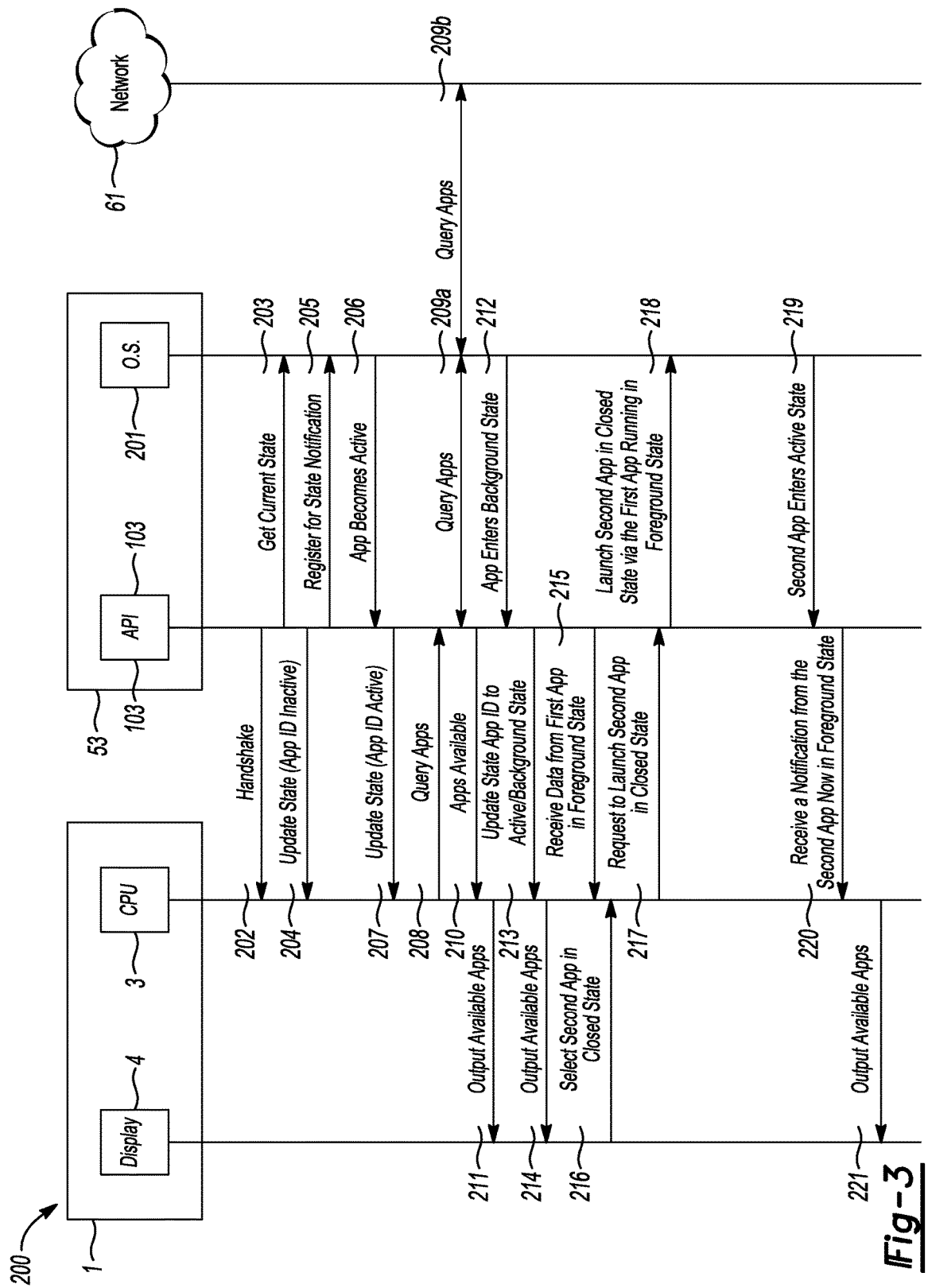
FIG. 3 is a block diagram illustrating the vehicle based computing system in communication with a connected device according to an embodiment.

FIG. 3 is a block diagram 200 illustrating the VCS 1 in communication with the mobile device 53, according to an embodiment. The VCS 1 may receive identification requests from the mobile device 53. The mobile device 53 may transmit an identification request once the VCS 1 is detected. The identification request may include, but is not limited to, requesting if the mobile device 53 is compatible with the VCS 1, and if the system has an application/service that may depend on the mobile device 53.

For example, the VCS 1 may have one or more applications stored in local memory, but may not choose to output the application icon/description at the display 4 because the one or more applications may require an external data source (mobile device 53, for example) to be connected with the VCS 1 for execution of the feature/function. In another example, the VCS 1 may have a navigation application stored in memory and the system 1 may not allow a user to launch the application until the global position receiver device (mobile device 53, for example) is present and connected with the system.

The VCS 1 may respond to the identification request and transmit an answer to the device 53. The answer may include, but is not limited to, a message notifying the mobile device 53 is not compatible with the VCS 1, or a message notifying the mobile device 53 is compatible with the VCS 1 and what application(s) and/or service(s) that may be enabled by the VCS 1. The VCS 1 may establish communication with the mobile device 53 via a handshake process 202. The handshake process may include a series of communications back and forth between the VCS 1 and mobile device 53 for system access authentication purpose. If the handshake is complete, the VCS 1 may receive data from one or more applications at the mobile device 53.

In response to the handshake, the integration client component 103 (application program interface (API), for example) of the mobile device 53 may get the current state 203 of one or more applications being executed by an operating system 201. The one or more applications may retrieve the current state by monitoring if their application state is moving from one state to another. The application may transmit the state change to the VCS 1 via the integration client component 103. The VCS 1 may update the current state 204 of the one or more applications. For example, an application at the mobile device 53 may transition from a foreground state to a closed state (non-foreground state, for example), therefore the mobile device 53 may transmit an application identification code as inactive for the application in the closed state. In another example, an application at the mobile device 53 may transition from a foreground state to a background state (non-foreground state, for example), therefore the mobile device 53 may transmit application identification code as remaining active for the application moved to the background state.

The integration client component 103 may also register for current state notification 205 of the one or more applications at the operating system 201. The one or more applications may detect a state change and send updates about the state change to the VCS via the API 103. The VCS 1 may receive an application identification code status change if the application should change from the non-foreground state to a foreground state. In another example, the VCS 1 may receive an application identification code status change if the application should change from the foreground state to a non-foreground state.

The integration client component 103 may receive a message that an application has become active 206 in the foreground state. The mobile device 53 may transmit a message to the VCS 1 that the application is in the foreground state (active, for example). The VCS 1 may update the application identification code status as active 207 for the application in the foreground state.

The VCS 1 may request a query of applications 208 at the mobile device 53 that may be available for implementation on the VCS 1. The request to query available applications 208 may also include an identification code associated with each application. The identification code may be used to allow the device 53 to query what applications are compatible with the VCS 1. For example, the VCS 1 may set a closed state as a default setting for an application at the mobile device before the application sends an update state to the system. The application(s) returned by the query, but not already connected, are assumed to be in an inactive state (closed state, for example). The VCS 1 may output the application(s) returned by the query as inactive at the display 4. In one example, the application at the display 4 may have an application icon that is in grey shading indicating to a user that the application is in an inactive state.

In one example, the identification code may contain several identifiers describing one or more build specifications of the VCS 1 including, but not limited to, hardware configuration, software version(s), user interface displays, and/or firmware version(s). The compatible applications may include applications that may be able to be executed by the VCS 1 based on the version of software, version of firmware, hardware configuration, and/or a combination thereof.

The mobile device 53 may receive the request to query 209a what applications are available and/or compatible with the VCS 1 based on the identification code associated with the system. The mobile device 53 may perform a query of its stored applications to determine which are compatible with the VCS 1. The device 53 may also transmit a request application list message 209b to a server 61 to retrieve a list of applications compatible with the VCS 1. The request application list message to the server 61 may include the VCS 1 identification code.

For example, the server 61 may receive the request application list message from the device 53 and execute a query to determine a compatible application list based on the VCS 1 identification code. The server 61 may transmit an application list 209b with relevant information to the device 53. The relevant information may include, but is not limited to, a short description and/or an icon of the application(s) in the compatible application list. The device 53 may receive the application list with relevant information from the server 204 and search for applications on the device 53 that match the applications on the list. In another example, the device 53 may receive the application list with relevant information from the server 204 and indicate which application(s) are available on the device 53 and which application(s) are not available. The device may transmit the application list including the available and non-available application(s) to the VCS 1. The VCS 1 may output to the user which application(s) are available and/or the application(s) that may be downloaded to device 53 based on the application list.

The VCS 1 may receive an application list of available applications 209a on the device that are compatible with the system. In another example, once communication has been established between the VCS 1 and device 53, the VCS 1 may transmit a request to query applications available based on the identification code associated with the VCS 1. The device 53 may communicate with a server to determine a list of available applications that are compatible with the VCS 1. The device 53 may receive this list of available applications from the server. The device 53 may compare the applications it has stored to the list of available applications received from the server that are compatible with the VCS 1. The device 53 may transmit to the VCS 1 the list of available applications 210. The VCS 1 may output 211 the available applications at the display 4.

In response to the available applications, the VCS 1 may allow a user to request an application to be launched at the device from a non-foreground state to a foreground state via the application in the foreground state.

The VCS 1 may receive an application status from the mobile device 53. The VCS 1 may receive a notification status (current state of operation, for example) from one or more applications at the mobile device 53 based on a change in state. For example, the VCS 1 may receive a foreground state status message from a first application at the mobile device 53 in the foreground state. In another example, the one or more applications at the mobile device 53 may transmit a message to the VCS 1 when the application changes operation states. For example, if the navigation application is changing from a background state to a foreground state, the application may transmit the status change to the VCS 1.

The mobile device 53 may detect 212 that an application has entered a background state from a foreground state. The VCS 1 may receive an application identification code status change if the application should change from the foreground state to the non-foreground state (background state, for example) or vice versa. The VCS 1 may update 213 the application identification code to remain in the active state for the application moving to the background state. The VCS 1 may output 214 the available applications based on the update of the application identification code for the application entering the background state.

For example, the display 4 may output a first application in a foreground state and a second application in a closed state. The VCS 1 may receive data from the first application 215 being executed in the foreground state. The VCS 1 may receive a request to launch the second application that is closed in a non-foreground state 216. For example, a user may select an icon associated with the second application at the user interface display 4 in communication with the CPU 3. The VCS 1 may transmit a request to launch the second application 217 from the closed state at the mobile device 53.

The VCS 1 may request to launch the second application using the first application in the foreground state. The request to launch the second application message may include a URL, application identification, and/or a unique identifier to recognize the second application at the mobile device. The mobile device may launch the second application 218 in the closed state via the first application running in the foreground state. The second application may transmit 219 a status change message to the VCS 1 so that the application identification status is active. The VCS 1 may receive a message 220 from the second application to notify the VCS 1 that the second application is in the foreground state. The VCS 1 may output 221 the second application as an active application at the display 4.

Figure 4:
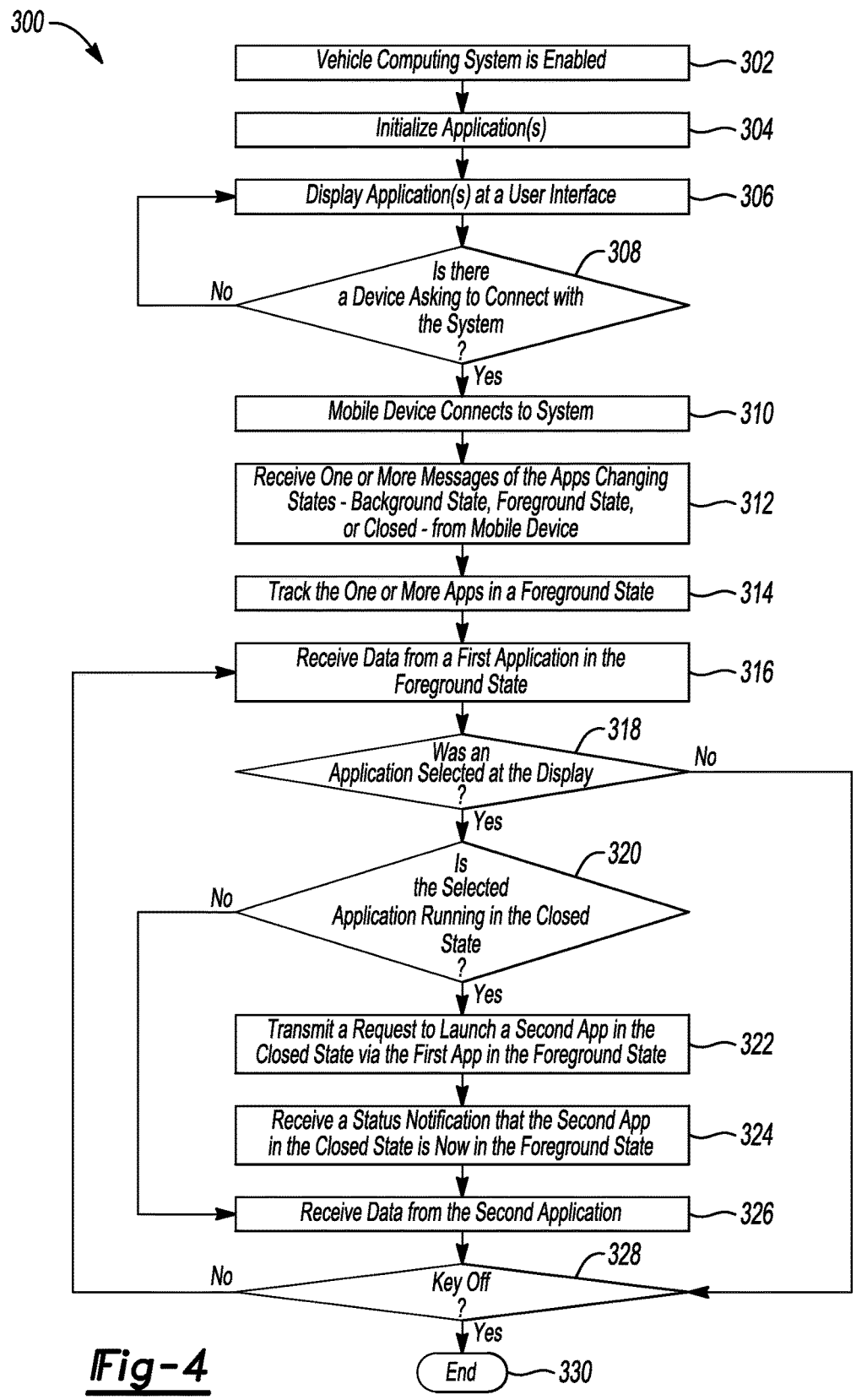
FIG. 4 is a flow chart illustrating the vehicle based computing system launching an application at the connected device according to an embodiment.

FIG. 4 is a flow chart illustrating the vehicle based computing system launching an application at the connected device according to an embodiment. The method 300 may be implemented using software code contained within the VCS 1. In other embodiments, the method 300 may be implemented in other vehicle controllers, or distributed among multiple vehicle controllers.

Referring again to FIG. 4, the vehicle and its components illustrated in FIG. 1, FIG. 2 and FIG. 3 are referenced throughout the discussion of the method 300 to facilitate understanding of various aspects of the present disclosure. The method 300 of tracking and launching a compatible feature/function/service application(s) while communicating with one or more devices 53 may be implemented through a computer algorithm, machine executable code, or software instructions programmed into a suitable programmable logic device(s) of the vehicle, such as the vehicle control module, the device control module, another controller in communication with the vehicle computing system, or a combination thereof. Although the various operations shown in the flowchart diagram 300 appear to occur in a chronological sequence, at least some of the operations may occur in a different order, and some operations may be performed concurrently or not at all.

In operation 302, the VCS 1 may be initialized and enabled based on a key-on position of an ignition system. The VCS 1 may initialize the one or more applications for execution in operation 304. The VCS 1 may display the one or more applications at the user interface in operation 306. For example, the VCS 1 may output one or more applications at the display 4 in communication with one or more controllers configured within the system. The VCS 1 may store, but choose not to display, one or more applications which may require an external data source to be present for launch and/or execution. The VCS 1 may search for one or more devices 53 requesting to connect with the system in operation 308. If the VCS 1 detects no device 53 requesting to connect, the system may continue to output the initialized applications to the display 4. If a device 53 is detected, the VCS 1 may attempt to connect using a communication link with the device in operation 310. The communication link may include wireless communication technology (Bluetooth, Bluetooth low energy, WiFi, etc., for example) and/or a wired connection (USB, SPI, UART, etc., for example).

In one example, the mobile device 53 communicating with the VCS 1 may include a navigation application in a background state, an internet radio application in a foreground state, a sports score application that is in an unknown state, and an audiobook application in a closed state. The VCS 1 may output to the display the internet radio application with appropriate brightness and/or shading based on the foreground state status while graying out the navigation application, the sports score application, and audiobook application in the unknown and background state.

In operation 312, the VCS 1 may receive one or more messages associated with application state changes from the applications of the mobile device moving to a foreground state to a non-foreground state or vice versa. For example, the internet radio application at the mobile device 53 changing from the foreground state to the closed state may send an application identification status message as inactive to the VCS 1. The VCS 1 may track the application identification status for the one or more applications based on the received messages from the mobile device in operation 314.

In operation 316, the VCS 1 may receive data from a first application in the foreground state. In one example, the VCS 1 may receive data from one or more applications in a foreground and/or background state. The VCS 1 may monitor if a second application is selected at the display 4 in operation 318.

Continuing from the example above, the second application is the audiobook application; a user may select the launch of the audiobook application by using a touch screen interface, voice commands, steering wheel controls, and/or a combination thereof. If the audiobook application was selected for execution, the VCS 1 may determine if the device 53 (external source, for example) is connected with the system. If the VCS 1 determines that the device 53 needed to execute the selected application is not selected or has lost connection, a message may be output at the display 4 to notify that the device 53 is disconnected. In response to the audiobook application being selected at the display 4, the VCS 1 tracked that the audiobook application as inactive in the closed state in operation 320.

In operation 322, if the second application (audiobook application, for example) is in a closed state (non-foreground/inactive state, for example), the VCS 1 may transmit a request to launch the second application (audiobook application, for example) via the communication link with the first application (internet radio application, for example) in the foreground state. The transmitted request may include a launch command configured to open the audiobook application at the mobile device 53 via the internet radio application. In response to the launch request, the VCS 1 may receive a status notification that the audiobook application went from the closed state to the foreground state in operation 324. For example, the VCS 1 may output to the display the audiobook application with appropriate brightness and/or shading based on the foreground state status.

The internet radio application may be pushed to the background state by the audiobook application being launched. The device 53 may transmit a message that the identification code for the internet radio application is changed to the background state. The VCS 1 tracks the one or more applications including the audiobook application in the foreground state, the internet radio application in the background state, the navigation application in the background state, and the sports score application in the unknown state. The VCS 1 may begin to communicate with the audiobook application in the foreground state in operation 326.

In another example, a user may select the launch of the sports score application in an unknown state. The VCS 1 may be aware that the sports score application is on the mobile device 53, however, is unaware of the current state of the application. The VCS 1 may request the launch of the sports score application via the application in the foreground state. For example, if the audiobook application is in the foreground state, the VCS 1 may request that the sports score application launch at the mobile device 53 via the audiobook application. The audiobook application may be pushed to the background state by the sports score application being launched. The VCS 1 updates the tracking of the one or more applications including the sports score application being in the foreground state, and the internet radio application, audiobook application and navigation application being in the background state.

The system may monitor for a disable request from one or more sources including, but not limited to, a key-off message received from an ignition switch, a message to disable the application from the device, and/or received input at a user interface 4 in operation 328. If a key-off request is received, the VCS 1 may begin to power down the one or more processors in operation 330.

Figure 5:
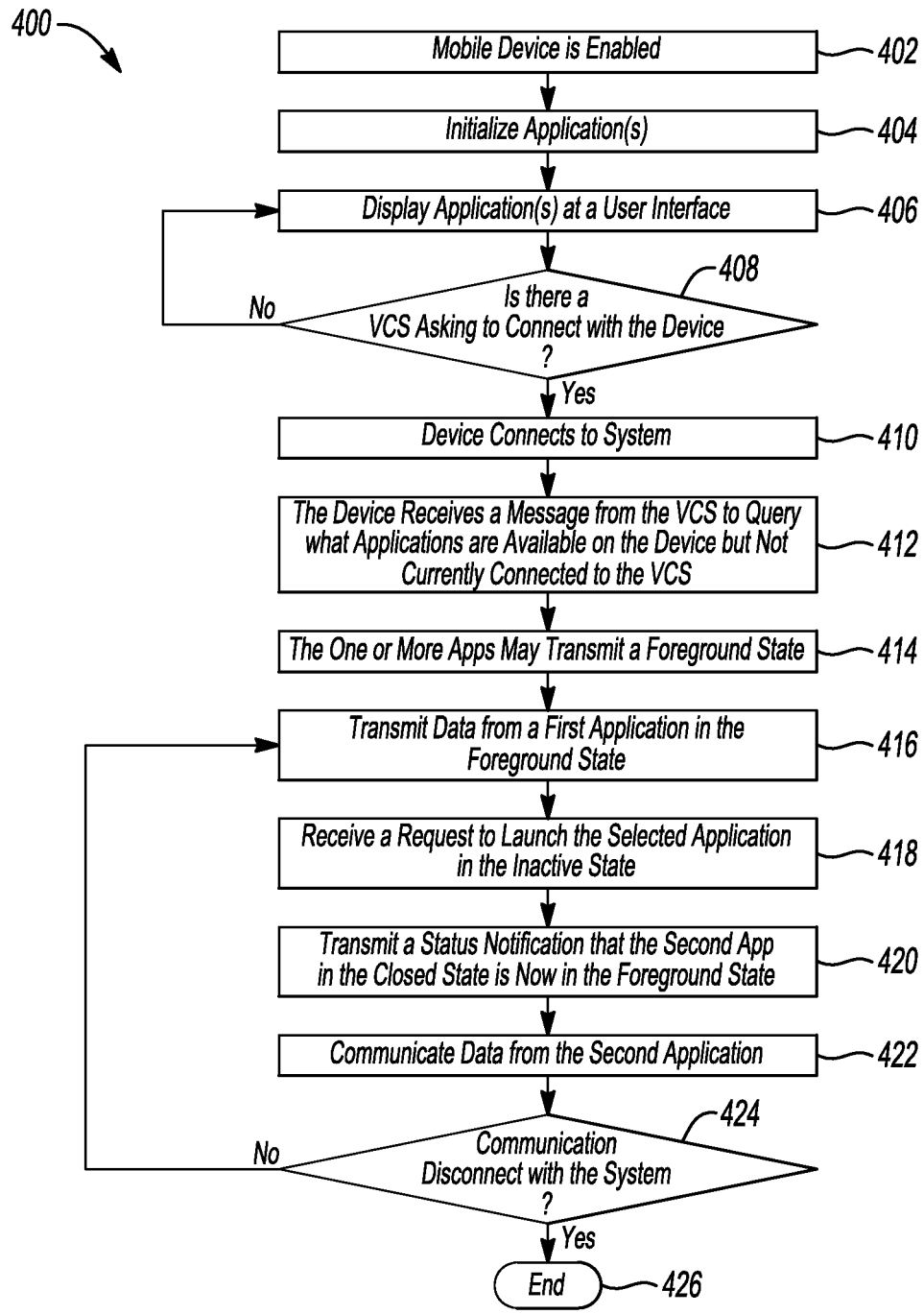
FIG. 5 is a flow chart illustrating the connected device launching the application based on a received request from the vehicle based computing system according to an embodiment.

FIG. 5 is a flow chart illustrating the connected device launching the application based on a received request from the VCS 1 via an application in the foreground, according to an embodiment. The device 53 may include, but is not limited to, at least one controller, one or more transceivers, and/or a user interface. The one or more transceivers may communicate with the VCS 1 using wireless and/or wired technology. The wireless technology may include, but is not limited to, WiFi, Bluetooth, and/or Bluetooth Low Energy. The wired technology may include, but is not limited to, USB, SPI, and/or UART.

In operation 402, the mobile device 53 may be initialized and enabled based on a power-on request. The mobile device 53 may initialize the one or more applications for execution in operation 404. The mobile device 53 may display one or more applications at a mobile device user interface in operation 406.

In operation 408, the device 53 may detect the presence of the VCS 1 using wireless and/or wired technology, and transmit a request to connect to the system. The device 53 may connect to the system 1 by sending over a message which may include, but is not limited to, the device identification 410. The device 53 may receive a message from the VCS 1 to query what applications are available on the device 53 but are not currently connected to the VCS 1 (applications not active and need to be launched, for example) in operation 412.

In operation 414, the one or more applications in the foreground state may transmit a foreground state message and/or other data to the VCS 1. A first application in the foreground state may transmit data to the VCS 1 in operation 416.

In operation 418, the mobile device may receive a request to launch a second application via the first application data transmission. For example, the first application may launch the second application in the non-foreground state using an open URL message. In response to the launch request, the second application may transmit a status message to the VCS 1 notifying the VCS 1 of the change from a closed state to a foreground state in operation 420. The VCS 1 may track that the second application is in the foreground state. The VCS may receive a notification status that the first application changed from a foreground state to a background or closed state. The VCS 1 tracking applications in the foreground state enables the system to determine applications for which an application launch request is transmitted. For example, if a launch request for an application is received at the user display 4, the VCS 1 may transmit a message to the second application to launch the application at the mobile device 53.

In operation 422, the second application in the foreground state at the mobile device 53 may communicate data to the VCS 1. The mobile device 53 may monitor for a communication disconnect from the VCS 1 including, but not limited to, a message to disable the application from the VCS. If a communication disconnect is detected, the mobile device 53 may begin to move the applications in the foreground state to a background state and/or closed state in operation 424. In response to the communication disconnection with the VCS 1, the system may end the method 400 in operation 426.

While illustrative embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a processor of a vehicle computing system, in communication with a mobile device via a wireless transceiver, configured to:
track which one of a plurality of mobile device applications installed to the mobile device is in a foreground state; and
in response to receiving a user request to launch a specified one of the mobile device applications that is not in the foreground state, send a message to the mobile device application in the foreground state requesting launch of the specified mobile device application,
wherein the specified one of the mobile device applications that is not in the foreground state is an emergency application, and the mobile device application in the foreground state receiving the message requesting launch of the emergency application is not an emergency application.

2. The system of claim 1, wherein the processor of the vehicle computing system is further configured to track which one of the mobile device applications is in the foreground state based on change-in-state notification messages received from the mobile device.

3. The system of claim 2, wherein not being in the foreground state includes being in a background state or a closed state on the mobile device.

4. The system of claim 1, wherein the processor is further configured to receive a change-in-state notification message from the mobile device responsive to the specified mobile device application moving from a closed state to the foreground state; and
responsive to receipt of the change-in-state notification message, update an indication of which one of the plurality of mobile device applications installed to the mobile device is in the foreground state.

5. The system of claim 1, wherein the processor is further configured to:
receive a change-in-state notification message from the mobile device responsive to the mobile device application in the foreground state moving from the foreground state to a background state; and
responsive to receipt of the change-in-state notification message, update an indication of which one of the plurality of mobile device applications installed to the mobile device is in the foreground state.

6. The system of claim 1, wherein the message requesting launch of the specified mobile device application includes a universal resource locator (URL) indicating an identifier of the specified mobile device application.

7. The system of claim 1, wherein the processor is further configured to communicate with a user interface display and receive the user request from the user interface display.

8. The system of claim 7, wherein the processor is further configured to output, to the user interface display, a first icon representing the one of the mobile device applications in the foreground state and a second icon representing the specified mobile device application, the first icon displayed in a state indicating the application being represented is in the foreground state, the second icon displayed in a state indicating the application being represented is not in the foreground state.

\* \* \* \* \*